United States Patent [19]

Joy

[11] 4,199,162
[45] Apr. 22, 1980

[54] SNOW SPORT VEHICLE

[76] Inventor: Elwood R. Joy, Hillcrest S. Shore Rte., Polson, Mont. 59860

[21] Appl. No.: 829,615

[22] Filed: Sep. 1, 1977

[51] Int. Cl.² .............................................. B62B 13/04
[52] U.S. Cl. .................................................. 280/12 K
[58] Field of Search ................ 280/12 K, 12 H, 21 R, 280/26

[56] References Cited

U.S. PATENT DOCUMENTS

| 1,447,094 | 2/1923 | Luhrs et al. | 280/12 K |
| 2,447,700 | 8/1948 | Hassman | 280/12 K |
| 3,088,748 | 5/1963 | Malmo | 280/12 H |
| 3,190,668 | 6/1965 | Husak | 280/12 K |

OTHER PUBLICATIONS

How to Make it Book of Crafts 1941, pp. 174, 176.

*Primary Examiner*—Robert R. Song

[57] ABSTRACT

A ski type runner has a slightly greater width than a ski and an arcuate curvature. The runner has spaced opposite first and second ends with the area of the first end being planar for approximately one quarter the length of the runner. The remainder of the runner curves arcuately. A seat is affixed to the runner in the area of the first end thereof and spaced from the first end for seating a rider a distance above the runner. A foot rest is affixed to the runner in the area of the second end thereof and spaced from the second end at a distance above the runner and extends transversely thereto.

1 Claim, 3 Drawing Figures

SNOW SPORT VEHICLE

BACKGROUND OF THE INVENTION

The present invention relates to a snow sport vehicle.

Objects of the invention are to provide a snow sport vehicle of simple structure, which is inexpensive in manufacture, used with facility and convenience, and functions efficiently, effectively and reliably to provide a great number of different kinds of thrills and excitement in use, which thrills and excitement are similar to those experienced by tobogganists, skiers, ski jumpers, snowmobilers, and the like.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
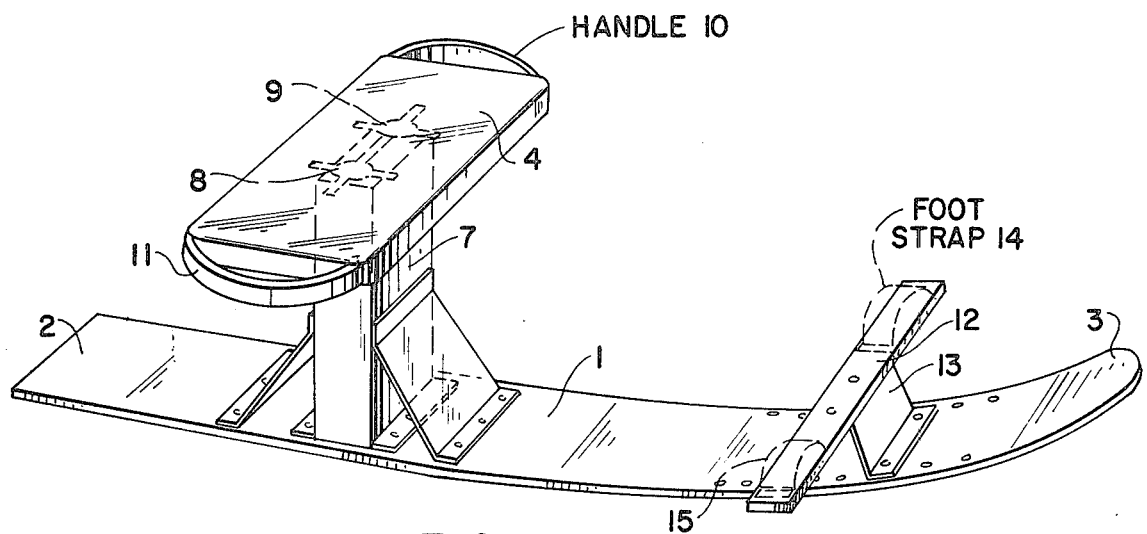
FIG. 1 is a perspective view of an embodiment of the snow sport vehicle of the invention.
Figure 2:
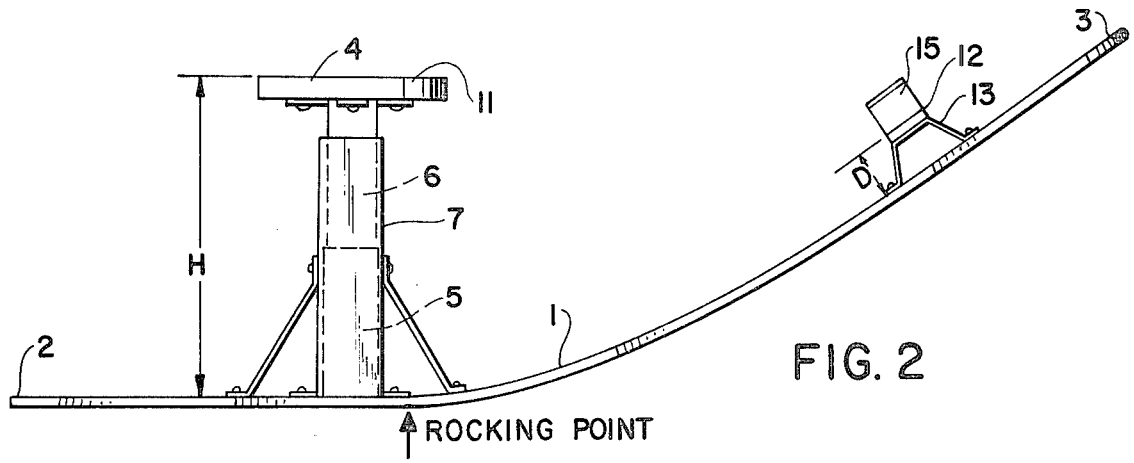
FIG. 2 is a side view of the embodiment of FIG. 1.

The snow sport vehicle of the invention comprises a ski type runner 1 having a slightly greater width W than a ski (FIG. 3) and a substantially arcuate curvature, as shown in FIGS. 1 and 2.

The runner 1 has spaced opposite first and second ends 2 and 3. The area of the first end 2 is substantially planar for approximately one quarter the length of the runner 1. The remainder of the runner 1 curves substantially arcuately. This is illustrated in FIGS. 1 and 2, and especially in FIG. 2, wherein the arrow labeled ROCKING POINT indicates the border between the substantially planar area of the first end 2 of the runner 1 and the substantially arcuately curved area of said runner.

A seat 4 is affixed to the runner 1 in the area of the first end 2 thereof and is spaced from said first end. The seat 4 seats a rider a distance H above the runner (FIG. 2). The seat 4 is adjustably mounted on the runner 1 for adjustment of the height H thereof above said runner. This is accomplished by supporting the seat on a pair of telescopically mounted support posts 5 and 6 in a housing 7. This enables the rider to adjust the seat 4 for his or her maximum comfort.

When the snow sport vehicle of the invention is used by adults, shock absorbers 8 and 9 are preferably provided, affixed to the bottom of the seat 4 and extending into the housing 7, for absorbing impacts of downward motion of the seat.

Figure 3:
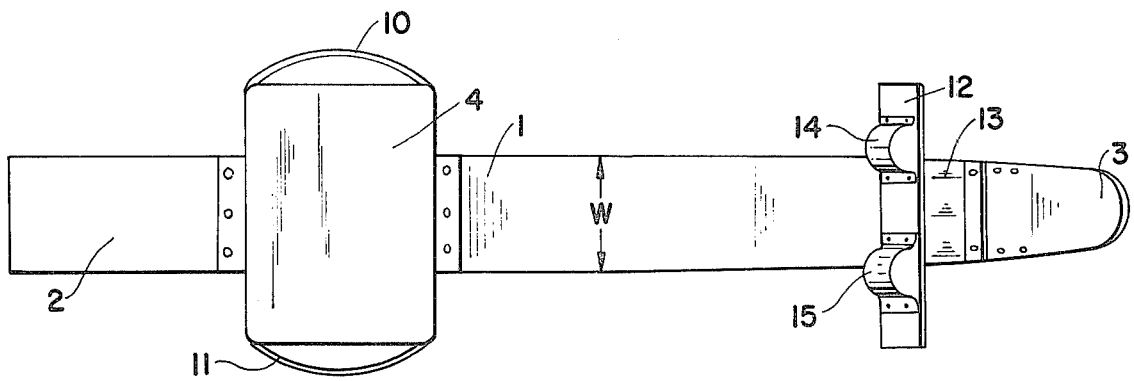
FIG. 3 is a top plan view of the embodiment of FIG. 1.

Handles 10 and 11 extend from opposite sides of the seat 4, as shown in FIGS. 1 and 3, to provide gripping devices for the rider so that he or she does not fall off the vehicle during a run.

A foot rest 12 is affixed to the runner 1 in the area of the second end 3 thereof and is spaced from said second end at a distance D above said runner (FIG. 2) and extends transversely to said runner. The foot rest is adjustably affixed to the runner for adjustment of the distance thereof from the seat 4. This is accomplished by affixing the foot rest mount 13 to the runner 1 via a plurality of holes spaced along the length of said runner, so that the rider may affix the foot rest at a distance from the seat which is most convenient in comfort of leg stretching for him or her.

The foot rest 12 has foot straps 14 and 15 thereon for releasably securing the feet of a rider thereto.

The snow sport vehicle of the invention is used by the rider seating himself or herself on the seat 4, gripping the handles 10 and 11, inserting his or her feet in the foot straps 14 and 15, and riding down a hill, mountainside, or any slope sufficient to provide enough momentum so that the vehicle moves with great speed over snow and ice on the incline. The arcuate nature of the runner 1 enables the vehicle to be rocked by the rider in a manner whereby it may be used to jump a crevice or gap in the slope in the manner of a ski jumper. The vehicle, if managed with some experience, lands with stability on the snow after traversing the crevice. The vehicle is readily steered by shifting of the body of the rider to either side.

While the invention has been described by means of a specific example and in a specific embodiment, I do not wish to be limited thereto, for obvious modifications will occur to those skilled in the art without departing from the spirit and scope of the invention.

I claim:

1. A snow sport vehicle, comprising
   a ski type runner having a slightly greater width than a ski and a substantially arcuate curvature, said runner having spaced length-extending side edges and spaced opposite first and second ends with the area of the first end being substantially planar for approximately one quarter the length of the runner and the remainder of the runner curving substantially arcuately;
   a seat affixed to the runner in the area of the first end thereof and spaced from said first end for seating a rider a distance above said runner, said runner being curved to an extent whereby the second end thereof extends higher above the first end thereof than said seat; and
   a foot rest adjustably affixed to the runner in the area of the second end thereof and spaced from said second end at a selected distance from said seat and a selected distance above said runner, said foot rest comprising a foot rest mount adjustably affixed to said runner and a foot rest cross member affixed to said foot rest mount and extending transverse to said runner and beyond the side edges of said runner, said foot rest cross member having foot straps thereon for releasably securing the feet of a rider thereto.

* * * * *